United States Patent [19]
Ryan

[11] Patent Number: 5,351,373
[45] Date of Patent: Oct. 4, 1994

[54] METHOD AND APPARATUS FOR HEAT STRETCHING SYNTHETIC FIBER ROPE

[75] Inventor: Richard J. Ryan, Anacortes, Wash.

[73] Assignee: Puget Sound Rope Corporation, Anacortes, Wash.

[21] Appl. No.: 949,038

[22] Filed: Sep. 21, 1992

Related U.S. Application Data

[63] Continuation-in-part of Ser. No. 922,552, Jul. 29, 1992.

[51] Int. Cl.⁵ .......................... D02J 1/22; B28B 11/08; F26B 7/00
[52] U.S. Cl. ...................... 28/240; 264/291; 34/380; 432/225; 28/245
[58] Field of Search ............... 28/240, 245, 246; 264/289.6, 291; 34/12, 141; 432/224, 225

[56] References Cited

U.S. PATENT DOCUMENTS

| | | | |
|---|---|---|---|
| 2,142,721 | 1/1939 | Dreyfus et al. | 28/240 X |
| 2,142,890 | 1/1939 | Dreyfus et al. | 28/240 X |
| 2,438,549 | 3/1948 | Elvin et al. | 28/240 X |
| 4,348,350 | 9/1982 | Meier et al. | 264/570 |
| 4,857,247 | 8/1989 | Raczkowski | 264/291 X |

FOREIGN PATENT DOCUMENTS

| | | | |
|---|---|---|---|
| 690796 | 7/1964 | Canada | 28/240 |
| 0021989 | 2/1985 | Japan | 28/240 |
| 0239539 | 11/1985 | Japan | 28/240 |
| 0239541 | 11/1985 | Japan | 28/240 |

*Primary Examiner*—Clifford D. Crowder
*Assistant Examiner*—John J. Calvert
*Attorney, Agent, or Firm*—Hughes, Multer & Schacht

[57] ABSTRACT

A method and apparatus for heat stretching a synthetic fiber rope. The rope is buoyed in a vessel containing a liquid medium, and this is heated to a predetermined stretching temperature. Tension is applied to the heated portion of the rope so as to stretch this to a predetermined increase in length. The process may be batchwise, or it may be continuous. In the batch process, a length of the rope is stretched in the heating vessel by a draw rod. In the continuous process, feed and take-up capstans pass the rope through a heating chamber, and then through a cooling chamber. The capstans are operated at different speeds so that the rope is tensioned and stretched between them within the vessel.

17 Claims, 7 Drawing Sheets

METHOD AND APPARATUS FOR HEAT STRETCHING SYNTHETIC FIBER ROPE

RELATED APPLICATIONS

This is a continuation-in-part application of copending application Ser. No. 07/922,552, filed Jul. 29, 1992.

FIELD OF THE INVENTION

The present invention relates generally to ropes and cordage, and more particularly, to a method and apparatus for heat stretching synthetic rope so as to enhance its load-bearing capabilities and other characteristics.

BACKGROUND

Typically, synthetic rope or cordage is made up of many thousands of individual strands of synthetic fiber. Each of these fibers has a certain load-bearing capacity (e.g., breaking strength), and theoretically, the total load-bearing capacity of the rope should be equal to the sum of these. However, in practice, this is not so: during the normal fabrication of the rope, the individual fibers do not all end up being of equal length, and so some of these take up the load while others may not do so until the shorter strands break. This problem has become more severe with the advent of ultrahigh strength fibers which stretch very little (e.g., 2%) before parting, as opposed to the 40% stretch or so which was exhibited by earlier nylon fibers and the like.

As a result, the actual load-bearing capacity of a rope is normally some relatively small fraction of the combined capacity of its fibers. In the art, this is expressed as "translational efficiency". For example, relatively large diameter synthetic lines (e.g., ⅜"–4") may typically have a translational efficiency as low as 30–40%. As a result, for a given application, these ropes must be much larger, heavier, and more difficult to handle than would be the case if their translational efficiencies were nearer their theoretical maximums.

Heat stretching of synthetic lines can dramatically increase translational efficiency. When the line is heated, the modulus of elasticity of the fibers is reduced, and then when tension is applied, the shorter fibers are stretched out until the longer ones begin to take a load, and are also stretched out; finally the great majority of the fibers will have the same length and so will be able to bear loads equally.

Heat stretching also tends to improve the structure of synthetic lines on a molecular level. As is known, the molecules of the initial fiber material are often poorly aligned in a somewhat isotropic state; heat stretching essentially "pulls" the polymer material out so as to cause alignment of a greater proportion of the chains of macro molecules along the fiber axis, so that these can bear tensile loading in a more efficient manner.

Heat stretching has been employed previously to achieve these goals, but only with individual yarns or very small diameter synthetic line. For example, both fishing line and bow strings have been successfully stretched by means of a hot gas process. This involves running the line between unequal diameter (or unequal speed) payout and takeup reels, and through a stream of heated air or other gas. The temperature of the gas is typically such that the line would be destroyed if it were to pause in the stream, but the reels are operated at a high rate of speed so that the line is only momentarily softened and stretched in the heated zone before cooling again.

The heat stretch process described in the preceding paragraph works well with very small diameter (e.g., 1/32") synthetic line, but it is inherently unsuitable for use with much larger lines such as braided or twisted rope, which may range upwardly of 4" in diameter. Firstly, the arrangement of very high speed payout and takeup reels is simply impractical for handling of rope of this size. Also, the insulating qualities of the rope material would prevent the core of the rope from becoming sufficiently heated to permit stretching before the exterior of the rope degraded in the hot gas stream; the heated gas provides a poor medium for uniformly heating the rope material, and it is also very difficult to control this so as to maintain an accurate temperature close to the melting point of the rope fibers.

Yet another serious problem stems from the weight of the rope itself (e.g., up to 5 lbs./ft. or more). If a segment of the rope is suspended between a pair of support points (for example, between a pair of eyes, or between a payout and takeup reel), this weight will tend to make the segment droop downwardly towards its center and place a heavy strain on the rope near the support points; if the rope has been heated for stretching, this will tend to cause the material to over-stretch and "neck down" near the support points, destroying the rope.

While these problems have previously presented themselves with respect to heat stretching synthetic fiber ropes, certain newly developed fiber materials exhibit characteristics which heighten these difficulties. One such a material is an ultrahigh molecular weight polyethylene (UHMWPE) fiber marketed by Allied Signal Corporation under the trademark "SPECTRA". This is a high specific strength material which is very abrasion and UV resistant, and which possesses a high specific modulus of elasticity and a low specific gravity. These qualities render it highly desirable for use in rope. However, the material also presents severe difficulties from the standpoint of previously-known heat stretching techniques: it possesses a low melting point (147° C.) and its tensile properties drop off rapidly near this temperature, and furthermore it acts as an excellent thermal insulator. Accordingly, these characteristics render it impractical to stretch a rope made of the SPECTRA ™ fibers using conventional heat stretch processes.

SUMMARY OF THE INVENTION

The present invention has solved the problems cited above, and is an apparatus and method for heat stretching a synthetic fiber rope.

Broadly, the apparatus comprises means for suspending a segment of the rope in a liquid medium, means for heating the liquid medium over at least a portion of the segment of rope so that this portion is heated to a predetermined stretching temperature, and means for applying tension to the heated portion of the segment so as to stretch this to a predetermined increased length.

The means for suspending the segment of rope in the liquid medium may comprise a vessel which is configured to be at least partially filled with the liquid, this having a chamber portion for receiving the segment of rope so that the segment is suspended therein. The suspending means may further comprise means for passing the rope through the chamber portion of the vessel on a continuous basis, so that the segment in the vessel is removed from the vessel and replaced on a continuous basis as it is stretched.

There may also be means for cooling the rope which has been stretched to a predetermined stabilization temperature, prior to the stretched segment passing out of the vessel. To do this, the vessel may comprise a heat set chamber in which the liquid medium is maintained approximately at the predetermined stretching temperature, and a cooling chamber in which the liquid medium is maintained approximately at the predetermined stabilization temperature, the vessel being arranged for sequential passage of the rope through the heat set chamber and then the cooling chamber. There may be a passageway interconnecting the heat set chamber and the cooling chamber, this being sized so as to permit passage of the heated portion of the rope segment therethrough without significant friction, with means being provided for maintaining the heat set chamber and the cooling chamber at approximately equal pressures so as to minimize migration of the liquid medium through the passageway. Furthermore, there may be airlock means mounted upstream of the heat set chamber and downstream of the cooling chamber so as to minimize loss of the liquid medium from the vessel as the rope passes therethrough.

The means for passing the rope through the vessel on a continuous basis may comprise a feed capstan which is attached to the rope upstream of the heat set chamber for feeding the rope into the vessel, and a take-up capstan which is attached to the rope downstream of the cooling chamber for withdrawing the rope from the vessel. The means for applying tension to the heated portion of the rope so as to stretch this may comprise means for operating the feed capstan so that rope is fed into the vessel at a first rate, and means for operating the take-up capstan so that the rope is withdrawn from the vessel at a second rate, which second rate exceeds the first rate by an amount which corresponds to the predetermined increase in length to which the rope segment is stretched.

The means for heating the liquid medium may comprise means for heating the medium in the heat set chamber to at least the predetermined stretching temperature, and means for maintaining the heat set chamber at that pressure at which the liquid medium boils at the stretching temperature, so as to maintain the medium at a uniform temperature throughout the chamber. The means for maintaining the heat set chamber at this pressure may comprise an exhaust line which is connected to the heat set chamber, and valve means for selectively bleeding pressure off from the heat set chamber through this line.

The method for heat stretching the synthetic fiber rope may broadly comprise the steps of suspending a segment of the rope in a liquid medium, heating the liquid medium over at least a portion of the segment so that this portion is heated to a predetermined stretching temperature, and applying tension to the heated portion of the segment so as to stretch the segment of rope to a predetermined increase in length.

The step of suspending the segment of rope in a liquid medium may comprise suspending the segment in a chamber portion of a vessel which is at least partially filled with the medium, and this may further comprise passing the rope through the cheer portion of the vessel on a continuous basis, so that the segment in the vessel is removed therefrom and replaced on a continuous basis as it is stretched.

The method may further comprise the step of cooling the segment of rope which has been stretched, to a predetermined stabilization temperature, prior to the stretched segment passing out of the vessel. To do this, the step of passing the rope through the chamber portion of the vessel may comprise passing the segment of rope sequentially through (a) a heat set chamber in which the liquid medium is maintained approximately at the predetermined stretching temperature, and (b) a cooling chamber in which the liquid is maintained approximately at the predetermined stabilization temperature.

The step of passing the rope sequentially through the chambers on a continuous basis may comprise feeding the rope into the vessel on a continuous basis from a feed capstan which is attached to the rope upstream of the heat set cheer, and withdrawing the rope from the vessel on a continuous basis with a take-up capstan which is attached to the rope downstream of the cooling chamber. Accordingly, the step of applying tension to the heated portion of the segment may comprise operating the feed capstan so that the rope is fed into the vessel at a first rate, and operating the take-up capstan so that the rope is withdrawn from the vessel at a second rate, which second rate exceeds the first by an amount which corresponds to the predetermined increase in length to which the segment is stretched.

DETAILED DESCRIPTION

I. Batch System a. Overview

Figure 1:
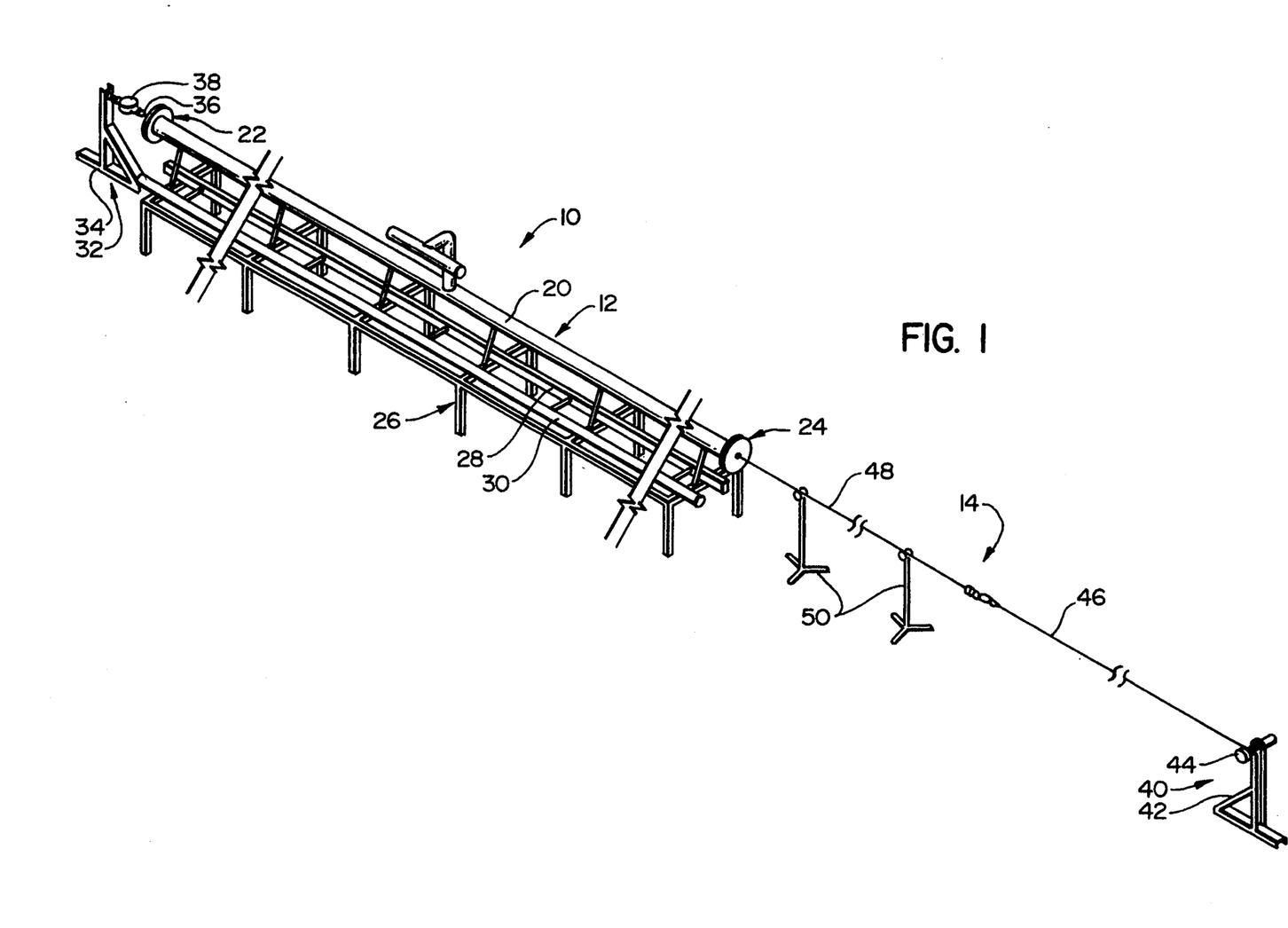
FIG. 1 is a perspective view of an apparatus for heat stretching rope on a batch-wise basis in accordance with the present invention, this comprising generally a tube assembly for suspending and heating the rope, and a tensioning assembly for stretching the rope.

According to one embodiment of the invention, FIG. 1 shows a rope stretching apparatus 10, this comprising generally a tube assembly 12 and tensioning assembly 14.

The principal functions of the tube assembly are to suspend the rope in a liquid medium so as to avoid placing weight on its attachment points, and to also ensure even heating of the rope to the desired stretching temperature. Accordingly, tube assembly 12 comprises an elongate tube member 20 closed off by end cap members 22, 24, so that this defines a cylindrical chamber for holding the rope and the liquid heating medium. Being that 800' is the maximum length in which relatively large diameter ropes are normally supplied in the industry, tube member 20 is preferably approximately this long, so that the treated ropes can have this length upon completion of stretching.

Tube member 20 is supported by a framework 26, preferably so that the tube member is free-floating on the framework in order to accommodate expansion. A burner rail 28 is mounted to the framework directly below tube member 20, and a gas/air mixture is provided to this by a manifold 30 which extends parallel to the burner rail. Thus, when the gas/air mixture is supplied to the burner rail and ignited, this provides a source of heat for the tube member. Of course, if desired, other sources of heat may be employed in place of the burner rail, including a steam jacket or electric band heater, for example.

As will be described in greater detail below, the segment of rope to be stretched is positioned so that this extends horizontally through tube member 20, and its ends are attached to the tensioning assembly 14. The tensioning assembly is made up generally of a stationary portion which is attached to one end of the rope, and a drawing portion which is attached to the other end of the rope. The stationary portion 32 is provided by a stanchion 34 which is anchored to the plant floor or other support surface, and a fixed-length link 36 which attaches to the first end of the rope. A tensiometer 38 is mounted between the link and the stanchion so as to provide a visual indication of the tension loading to which the rope is subjected.

The drawing portion 40, in turn, is made up of a second support stanchion 42, and in the illustrated embodiment this provides an anchor for a winch 44, which may be either electrically or hydraulically operated. The winch selectively applies tension to a cable 46, and the end of this is mounted to a draw rod 48. The rod extends through an opening in end cap member 24 and into the interior of tube member 20. The inner end of the draw rod 20 is attached to the second end of the rope inside of tube member 20, so that tension may be applied by activating winch 44 and drawing rod 48 outwardly through end cap 24. As the draw rod is pulled out of the tube, it is supported on spaced-apart roller stands 50. Of course, other means for applying tension to the draw rod may be substituted for the winch 44, including air or pneumatic cylinders, for example.

b. Systems and Operation

Figure 2:
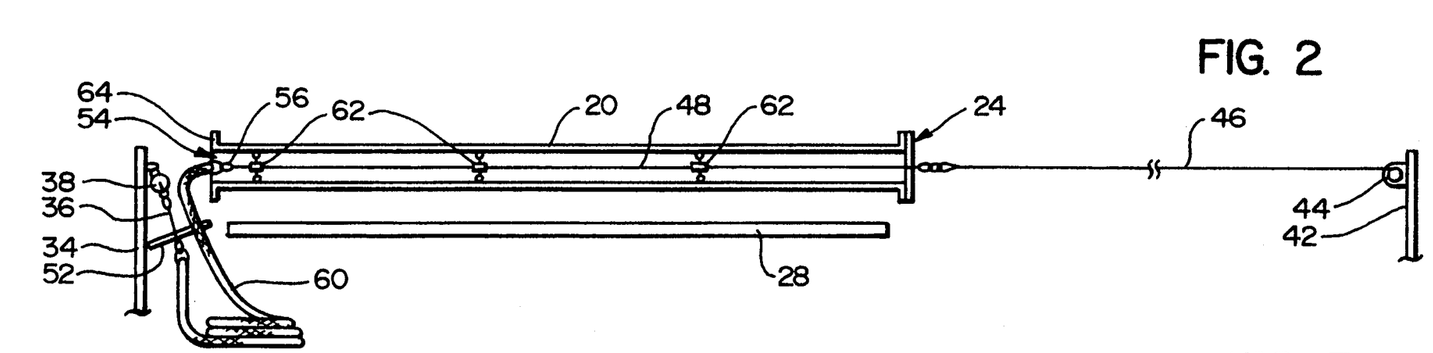
FIG. 2 is a longitudinal cross section through the apparatus of FIG. 1, showing a segment of rope being fed into the tube assembly in preparation for stretching.
Figure 3:
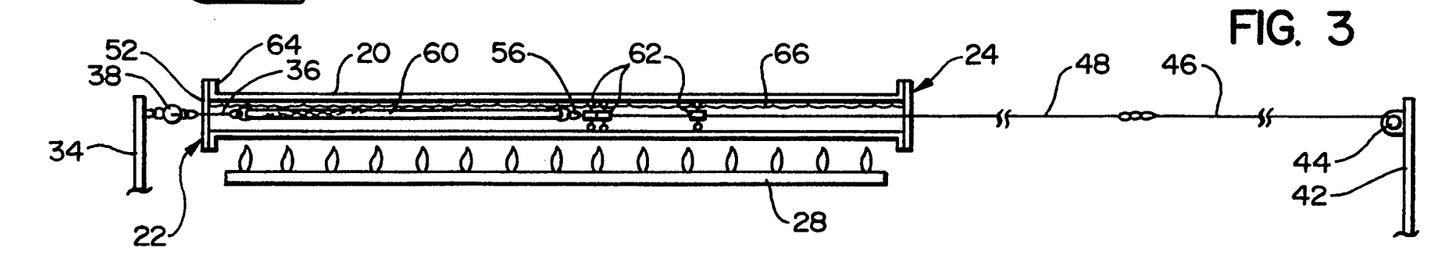
FIG. 3 is a view similar to that of FIG. 2, showing the rope suspended in the tube assembly and being heated in preparation for stretching.

FIGS. 2-3 illustrate the basic sequence of operations by which this apparatus is used to heat stretch a segment of rope. FIG. 2 shows the initial loading of the tube assembly. To do this an end plate 52 is removed from end cap member 22 so as to open the bore 54 of the tube member, and draw rod 48 is run fully into tube member 20 so that its inner end 56 is positioned near the opening so that personnel can reach this. The first end of the rope 60 is then shackled or otherwise attached to the end of the draw rod, and then winch 44 is operated to pull rod 48 back into tube member 20 as personnel feed the rope into the bore; as will be described in greater detail below, rod 48 is supported for this movement by a series of trolley units 62. Then when the second end of the rope reaches the opening into bore 54, the take-up on winch 44 is halted, and end plate 52 is mounted back on flange 64 so as to seal the bore. As was noted above, this end of the rope is shackled to one end of link 36, which extends through an orifice in the end plate 52.

After sealing, the tube is at least partially filled with a liquid medium 66. This medium serves several purposes. Firstly, it buoys the rope so as to give it essentially neutral buoyancy, thus eliminating the tendency of the weight of the rope to cause uneven stretching and "necking down" at the attachment points. For this reason, the specific gravity of the fluid (at the intended stretching temperature) is preferably approximately equal to that of the rope material; consequently, it has been determined that water is a suitable liquid medium for use with ropes made of the Spectra TM material discussed above, being that both of these have a specific gravity of approximately 0.97 at 140° C.

Furthermore the liquid medium serves as a conductive medium for transferring heat to the rope, and it also serves to establish uniformity of heating throughout the length of the tube, by taking advantage of the boiling point phenomenon which is exhibited by the liquid. This is done by filling most of the tube with the liquid, but leaving a small air gap (about 1" in an 8" diameter tube), as can be seen in FIG. 3, and also FIG. 6. The supply of gas/air mixture to burner rail 28 is then turned on and ignited (see FIG. 3), and as the water begins to heat, the tube member is maintained in a sealed condition so as to prevent the escape of pressure; this causes the pressure in the tube to increase so as to prevent the liquid from boiling as it is being heated. The pressure in the tube is monitored, and heating continues until the pressure reaches the point where this corresponds to the known boiling point for the liquid at the desired temperature for stretching the rope. For example, if it is desired to stretch a rope made of the Spectra TM material described above at 140° C., and water is employed as the liquid medium, the heating continues until the pressure reaches 37.3 psi; similarly, if stretching at 135° C. is desired, the water is heated until the pressure reaches 30.3 psi, and so on. At this point, the pressure in the tube member is relieved in a controlled manner, so that the liquid begins to boil along the entire length of the tube. In this manner, temperature differentials (i e., "hot" and "cold" spots) are eliminated: the hot spots boil more rapidly and the cold spots boil more slowly until an equal temperature is achieved throughout the tube member. This also ensures that there is thorough heating of the fibers of the rope, and in those cases where the insulating qualities of the fibers are expected to be a significant factor, the known thermal conductivity of the fiber material may be used to calculate how long it will take to overcome this so as to heat the rope to its core, and the elevated temperature can be maintained for this period of time.

Figure 4:
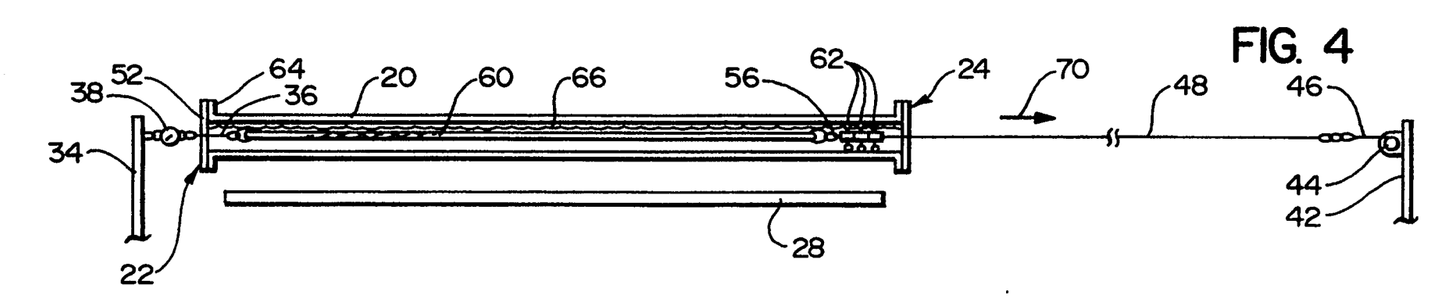
FIG. 4 is a view similar to those of FIGS. 2–3, this showing the rope having been stretched to an extended length by the tensioning assembly.

Once the rope has been heated to the desired temperature, stretching commences by applying tension with winch 44 so that draw bar 48 is withdrawn from the end of tube member 20 in the direction indicated by arrow 70 in FIG. 4. As this is done, the rope is elongated, with a 33–67% increase in length being typical, and there is a corresponding decrease in the diameter to the rope. The tension is monitored during this step by viewing tensiometer 38, so as to avoid excessive loading and possible damage of the rope.

Once the rope has been stretched to the desired length, the retraction of draw rod 48 is halted, and then the remaining pressure in the tube assembly is bled off to begin cooling; as this is done, the material of the rope regains its tensile strength. If desired, a residual tension may be maintained on the rope during cooling, so as to prevent shrinkage. Also, it should be noted here that, if desired, the increase in tensile strength which occurs upon cooling may be employed to terminate stretching of the rope at the desired length, rather than controlling this by shutting down the winch; in other words, when the rope has reached the desired length, the pressure may be dumped from the tube member (either manually or automatically), and the resulting rapid decrease in temperature will be accompanied by a corresponding rapid increase in the tensile resistance of the rope such that this will exceed the tension which is applied by the winch and so stop the drawing out of rod 48.

Once the stretching of rope has been completed, the water is drained from the tube assembly, and this is again opened by removing end plate 52. The treated rope can then be removed by backing this out through the tube.

Figure 5:
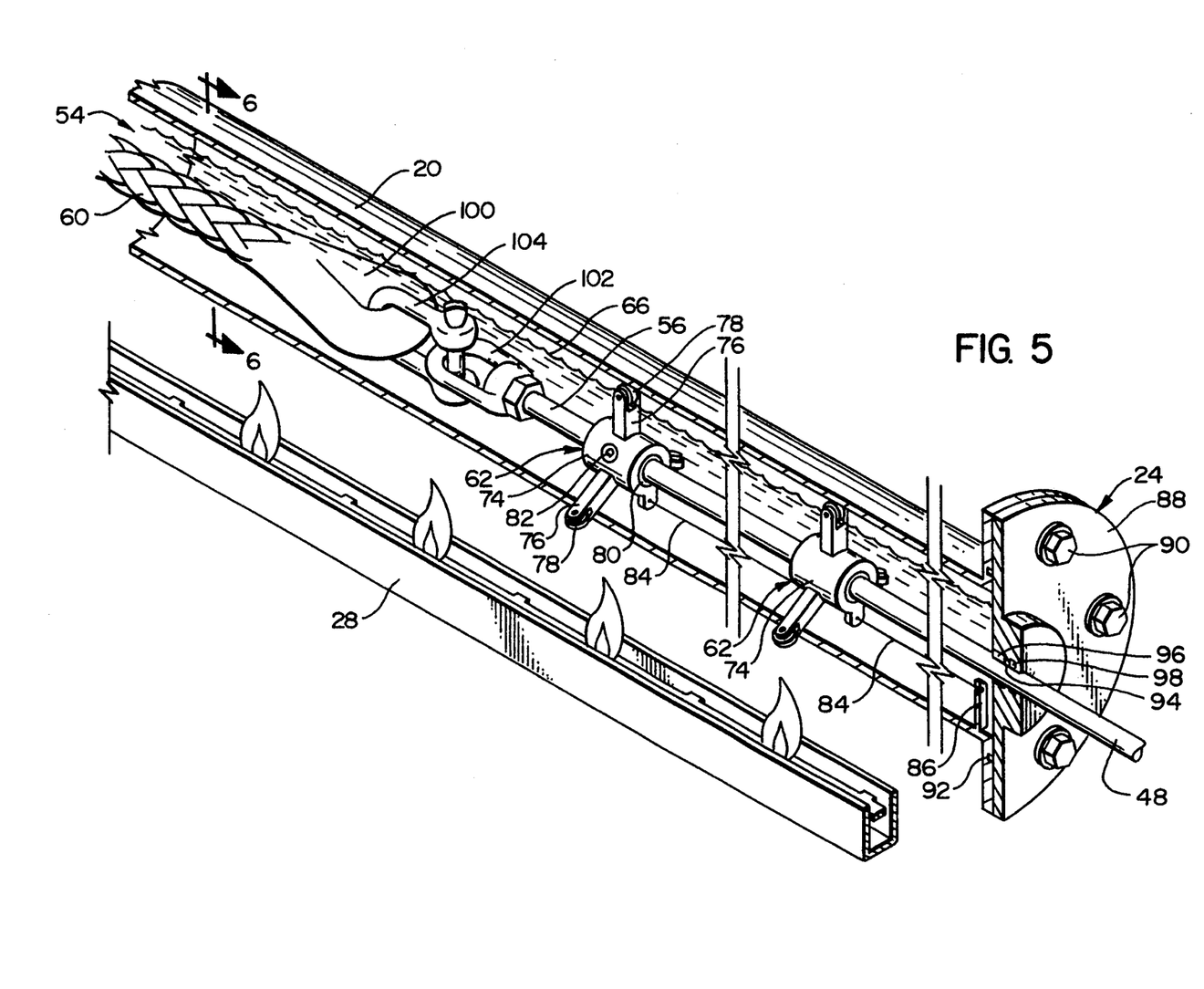
FIG. 5 is an isometric view of an end portion of the apparatus of FIGS. 1–4, this being shown partially cut away to reveal the tensioning rod which is attached to the end of the rope, and the trolley units which support this for movement within the tube.
Figures 6, 7:
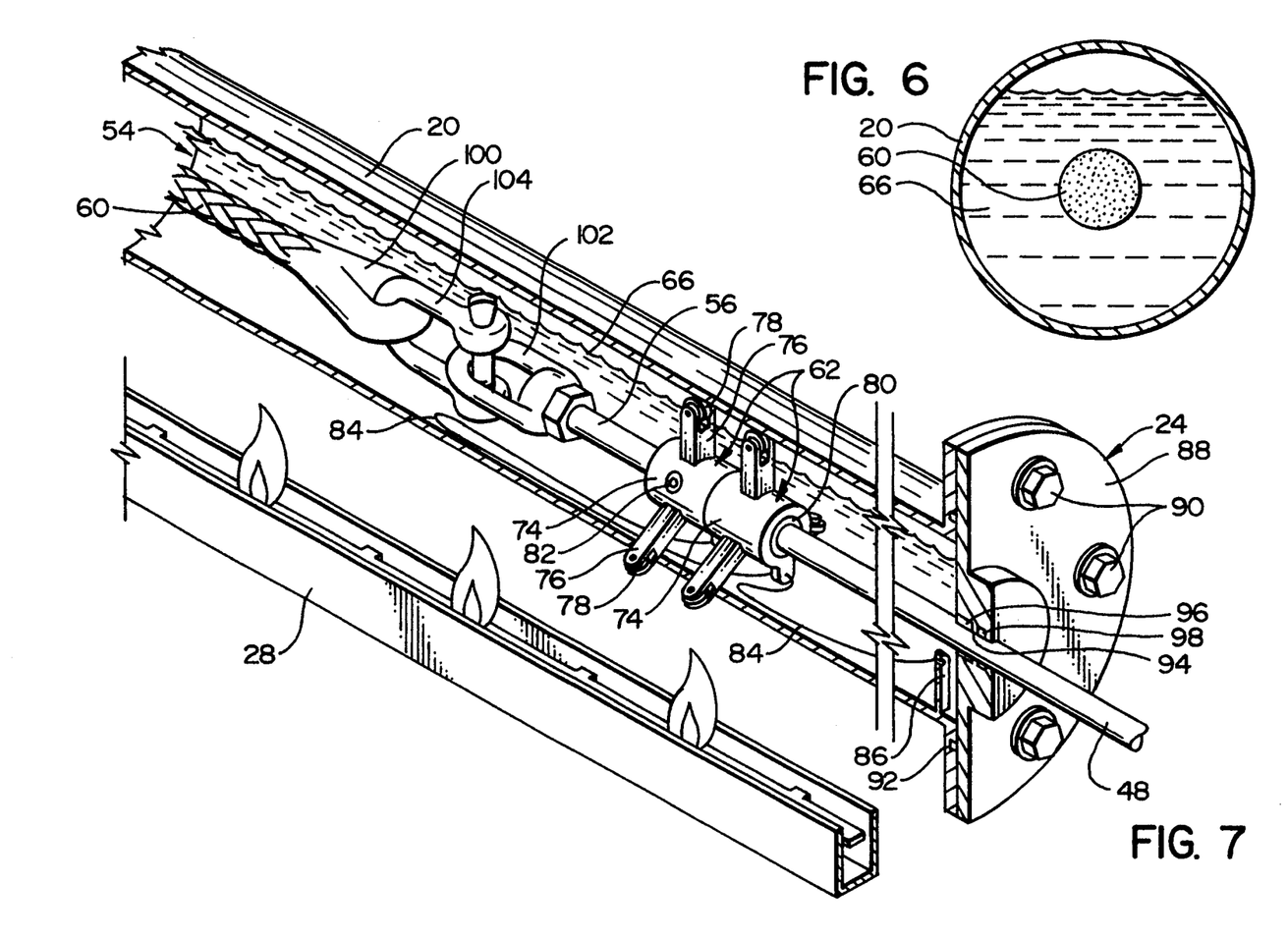
FIG. 6 is an isometric view similar to FIG. 5, showing the tension rod having been withdrawn so as to stretch the rope, and the manner in which the trolley units move together as this is done.
FIG. 7 is a transverse cross section taken through the tube assembly of FIG. 5 along line 7—7, this showing the manner in which the rope is buoyed within the tube by the liquid heating medium.

FIGS. 5 and 7 illustrate the structure of the trolley units which support draw rod 48 in greater detail, and also the arrangement of the seals of the end cap members. FIG. 5 shows the arrangement of the trolley units 62 when the draw rod is extended relatively far into tube member 20. As can be seen, each of the trolley units comprises a central hub 74 which fits around the draw rod, and three legs 76 which extend radially from this to support rollers 78 which bear against the inside wall of the tube member. The draw rod is supported for sliding movement through hubs 74 by bearing sleeves 80; however, the trolley unit located nearest the inner end of rod 48 is fixedly mounted to this, as by a set screw 82. A flexible line 84 is attached to this end trolley unit and extends back towards end cap member 24; the remaining trolley members 62 are attached to this line at intervals, and the end of the line is fixed to an anchor 86 near the end of the tube. Thus, as is shown in FIG. 5, when the rod 48 is pushed into the tube, the fixed end trolley unit pulls the flexible line 84 more-or-less taught, so as to position the remaining units at spaced apart distances along the length of the draw rod so that they provide proper support for this.

Then, as the rod 48 is withdrawn from the tube assembly, the trolley units "accordion" together in the manner shown in FIG. 7, so as to permit the end of the rod to be drawn to a position adjacent the end of tube member 20. As is shown, the trolley unit which is fixed near the end of the rod is drawn through the tube, and as this is done, the flexible line 84 goes slack, and the end unit moves into abutment with the next unit in line; with continued movement of the rod, this continues until all of the trolley units are pushed together into a compact group near the end of the tube.

FIGS. 5 and 7 also show the arrangement of seals at end cap member 24. As was noted above with respect to end cap 22, this is made up generally of a flange 86 which is mounted to tube member 20, and an end plate 88 which is mounted to this by bolts 90. The sealing interface between the flange and end plate is augmented by an O-ring seal 92 which extends annularly around the end of the tube. As noted above, draw rod 48 slides through a bore 94 in plate 88, and a sliding seal is provided therewith by a bearing 96 and sleeve 98. Inasmuch as the pressures and temperatures within tube member 20 are relatively moderate when stretching ropes made of Spectra TM fibers, this bearing and sleeve may be formed of nylon and Viton TM, and the sleeves 80 and rollers 78 described above can be formed of Delrin TM and nylon. Of course, if the fiber material calls for more severe temperatures and pressures for stretching, other seal materials having suitable parameters can be selected. The construction of the other end cap member 22 is substantially identical to that shown here; the sliding seal which is provided by this arrangement is necessary because link 36, although relatively stationary, must nevertheless be free to slide through the end plate so as to permit tensiometer readings to be taken, the actual amount of longitudinal movement of the link being about 1 inch.

Also seen in FIGS. 5 and 7 is the manner in which the draw rod 48 is attached to the end of rope 60. FIG. 7 shows that there is a soft eye 100 formed at the end of the rope, and this is connected to a metal ring 102 on the end of rod 48 by a shackle 104; a substantially identical arrangement is used to attach the other end of the rope to the stationary link 36. Alternatively, the ends of the rod and link can be provided with a simple hook, over which the eye at the end of the rope can be slipped.

Figure 8:
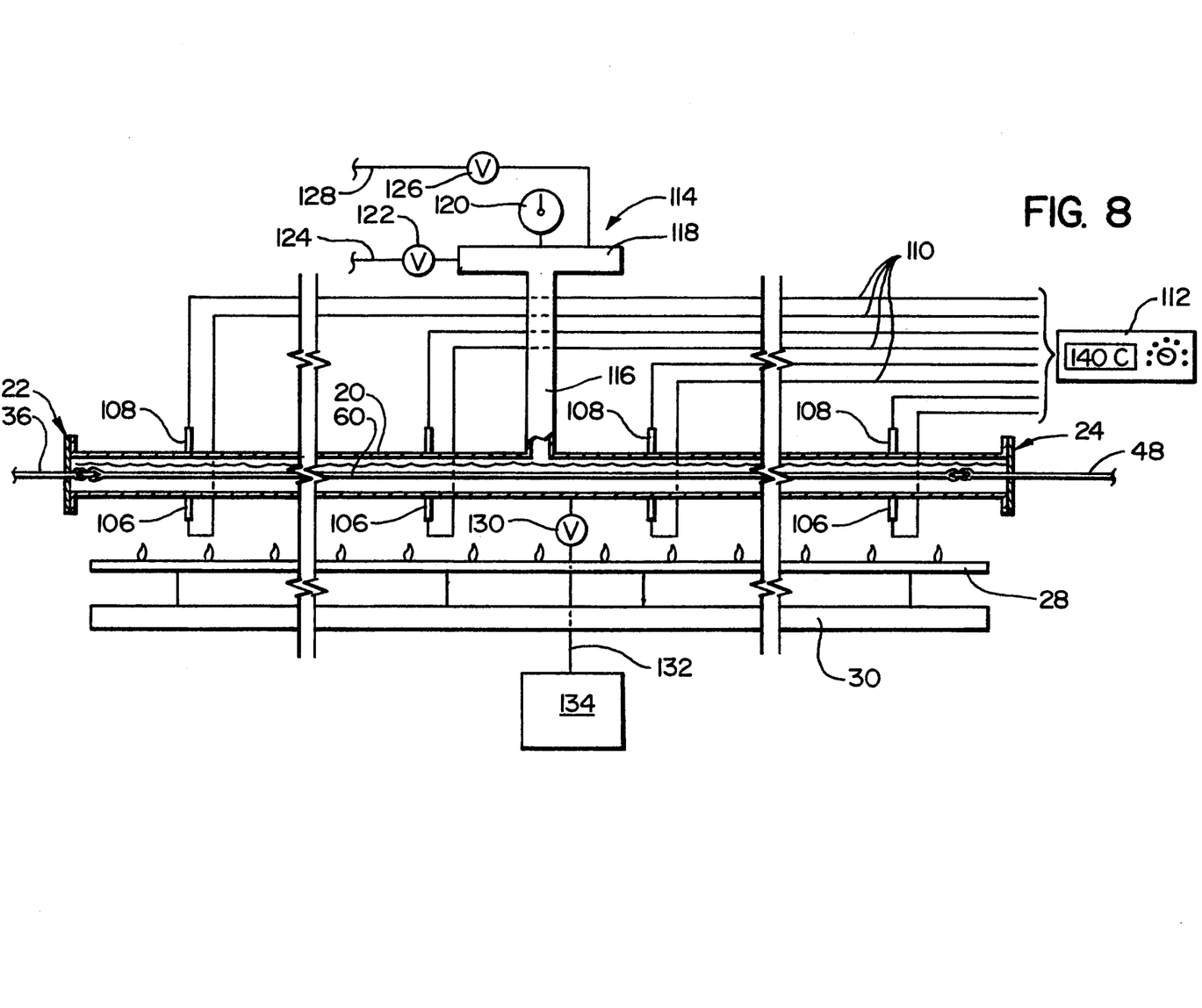
FIG. 8 is a schematic view of the apparatus of FIGS. 1–7, this also showing the control systems which are associated therewith.

FIG. 8 is a schematic view of the apparatus described above, showing its monitoring and control systems. The tube member 20 is provided with a series of temperature sensors spaced along its length; as is shown, these may include lower sensor units 106 which are mounted along the bottom of the tube member so as to measure the temperature of the water, and upper sensor units 108 which are mounted along the top of the tube so as to measure the temperature of the steam above the surface of the liquid. The sensors are connected by means of leads 110 to a monitor unit 112 which selectively displays the temperature sensed at each of the locations, so that the operator can verify that the tube has been evenly heated and there are no hot or cold spots. As was described above, this temperature equalization is achieved by a controlled bleeding of the air/steam pressure in the tube once the desired temperature has been reached. A pressure control assembly 114 is provided for this purpose, and this comprises a vertical stand pipe which extends upwardly from the tube member 20 so as to be in fluid communication with the air gap over the liquid, and a horizontal header tube 118 which is mounted to the upper end of this. A pressure gauge 120 indicates the pressure in header tube 118, and being that this is in communication with the air gap through the length of the main tube member 20, this indicates the pressure over the whole of the system. The operator observes the gauge to determine when the desired pressure has been reached, and then opens a back pressure valve 122 to maintain this by relieving pressure from header tube 118 through relief line 124; by doing this, the operator is able to control the temperature of the liquid medium at the desired level for a particular fiber material, as described above.

Once the heat stretching of the rope is terminated, the operator throws open a ball valve 126 which also communicates with header tube 118; this dumps the remaining pressure in the tube assembly through discharge line 128, rapidly cooling the liquid medium and preparing the system for draining. This is performed by opening drain valve 130 so that the water drains out of the tube assembly through drain line 132, and into hot water tank 134. To enhance system efficiency, tank 134 may be insulated so that this stores the water or other liquid medium at an elevated temperature for subsequent reuse.

c. Process Considerations

As was noted above, the process of the present invention has proven especially effective for heat stretching ropes made of Spectra TM fibers. The melting point of this material is 147° C., and it has been found that heat stretching of such ropes can be performed within the range from about 125° C. to 150° C.; in general, it has been found that the range from about 140°-150° C. is optimal, being that at lower temperatures (e.g., 135° C.), the measured increase in tensile strength was found to drop off, and below about 130° C., filament breakage began to be observed.

In addition to temperature, other control factors which were found to have an impact on the quality of the finished rope included the total percent increase in length, and also the pull speed at which the rope is stretched. The following example illustrates experimental results which were achieved by controlling these factors.

EXAMPLE

| Material--Spectra TM Braided Rope | |
| --- | --- |
| Stretch Temperature | 140° C. |
| Total Length Increase | 67% |
| Pull Speed | 36%/min. |
| Initial Tensile Strength | 13.59 gm/denier (gpd) |
| Finished Tensile Strength (after heat stretching) | 23.58 gpd |
| Increase in Tensile Strength | 78% |
| Initial Length of Elongation at Break | 6.9% |
| Finished Length of Elongation at Break | 3.2% |

These results clearly demonstrate the increased tensile strength and decreased length of elongation at break (i.e., "stretch") of the finished product.

II. Continuous System a. Overview

Figure 9:
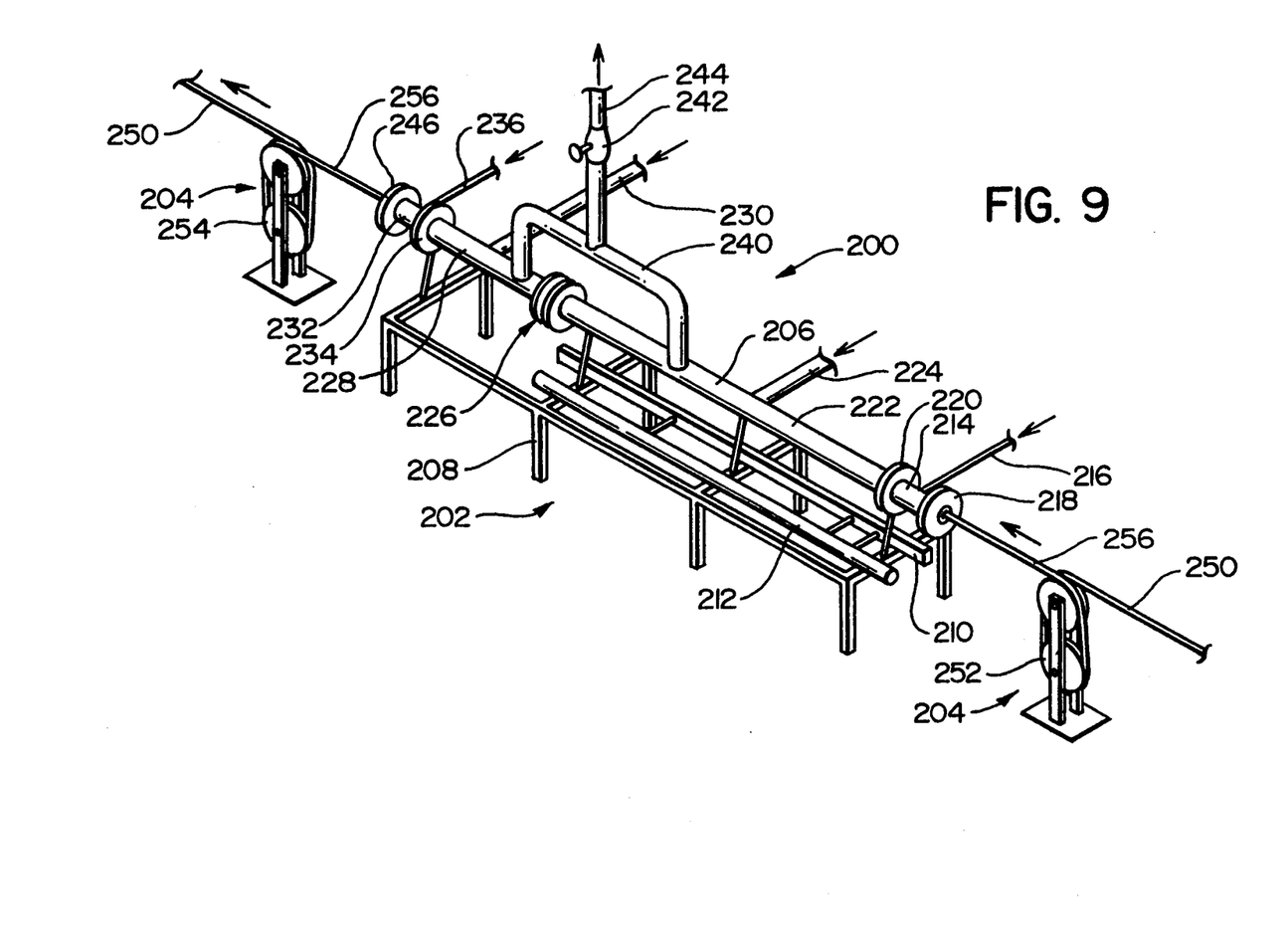
FIG. 9 is a perspective view similar to FIG. 1, showing an apparatus for heat stretching rope on a continuous basis in accordance with the present invention, this comprising generally a multi-chamber tube assembly and feed and take-up capstans for passing the rope through this.

According to a second embodiment of the invention, FIG. 9 shows an apparatus 200 for stretching rope on a continuous basis. This comprises generally a tube assembly 202 and a capstan system 204 for drawing the rope through the tube assembly, and for applying tension to the segment within the tube assembly as this is done.

The tube assembly 200 resembles that described above in general aspect, inasmuch as this comprises a vessel for the liquid medium for heating and supporting the rope. Accordingly, tube assembly 202 comprises an elongate tube member 206 supported on a framework 208, with burner rail 210 being mounted on the framework to extend below the tube assembly; in the manner previously described, and this is supplied with gas/air mixture from an elongate manifold 212.

By contrast with the batch process embodiment which was described above, however, this tube member 206 is segmented into a series of compartments, through which the rope proceeds sequentially as it undergoes the heat stretching process. Beginning at the entry end, the first compartment is an airlock chamber 214, to which air pressure is supplied via compressed air line 216; as will be described in greater detail below, this and the corresponding airlock chamber at the other end of the tube assembly serve to limit the escape of pressure from the main process chambers of the assembly.

The rope enters the airlock chamber through an orifice in a first end cap 218 and then passes from this through a first divider bulkhead 220 into the main heat set chamber 222. The liquid heating medium is supplied to this chamber via fluid supply line 224, and is heated by the burner rail which extends beneath this section of the tube assembly. Heat stretching of the rope takes place primarily within chamber 222, and then this proceeds through the next divider bulkhead into a cooling chamber 228. This is supplied with cooling liquid through cooling line 230, and this cools the fibers of the rope to a temperature at which they are stabilized against damage or breakage as the rope is pulled from the tube member: for example, a stabilization temperature of approximately 80° C. has been found suitable for the Spectra TM fiber material described above.

The heat set and cooling chambers 222 and 228 are interconnected by a manifold 240, so that the pressure is equalized between these in order to prevent migration of hot/cold fluid from one chamber to the next. The back pressure control valve 242 is also in communication with this manifold, for stabilizing the temperature in the heat set chamber at the desired level by selectively releasing pressure through bleed line 244, in the manner described above. The final compartment in the assembly is a second airlock chamber 232, which is separated from the cooling chamber by divider bulkhead 234; as with airlock chamber 214, this is supplied with air pressure by supply line 236 and minimizes escape of pressure from the cooling and heating chambers of the assembly. The rope exits the downstream end of the chamber through a second end cap member 246.

The longitudinal movement of the rope 250 through the tube assembly is controlled by the capstan system 204; this comprises a feed capstan 252 which engages the rope upstream of the tube assembly, and a take-up capstan 254 mounted downstream of the assembly. The capstan system thus moves the rope continuously through the tube assembly in the direction indicated generally by the arrows in FIG. 9; however, the feed and takeup capstans operate at different speeds are of different sizes, so that the rope segment 256 between them is subjected to the tension necessary to provide the stretching (e.g., the take-up capstan runs faster than, and/or is larger than the payout capstan).

b. System and Operation

Figure 10:
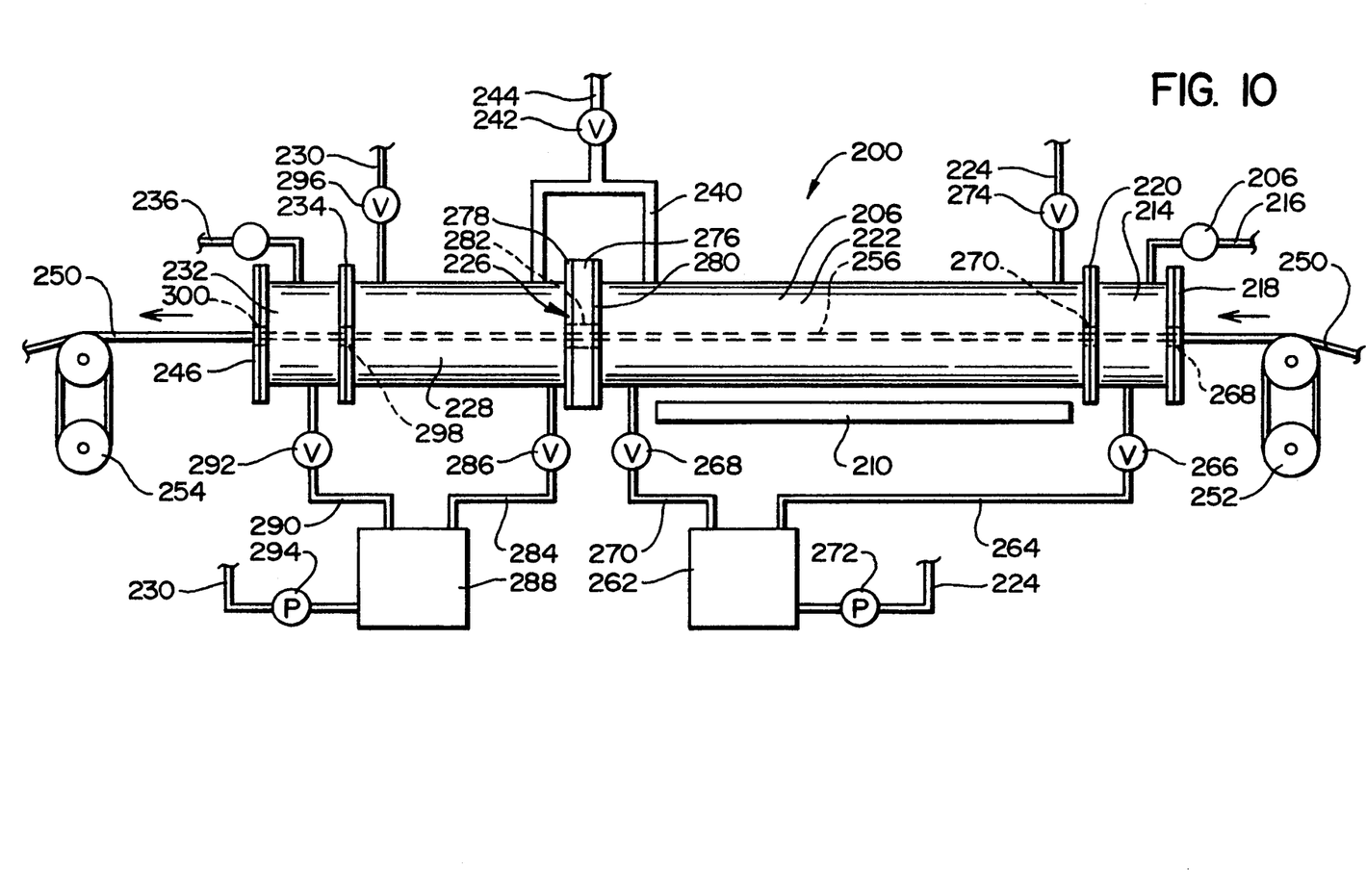
FIG. 10 is a longitudinal cross section through the apparatus of FIG. 9, showing the rope being stretched therein and the systems for controlling the pressures and temperatures within the chambers of the tube assembly.

Having provided an overview of the continuous heat stretching apparatus of the present invention, its operation and a number of its systems will now be described in greater detail with reference to FIG. 10, which provides a schematic view of apparatus 200.

As previously described, the rope enters the entrance airlock chamber 214 through end cap 218, and exits this through a first divider bulkhead 220 into the heat set chamber. The entrance airlock is maintained at a pressure which is slightly below that of the adjacent heat set chamber; this is done by supplying the airlock with a constant flow of compressed air through line 216, this being controlled by pressure regulator 260. The airlock greatly reduces the loss of liquid from the heat set chamber; however, there will normally be some flow of fluid from the heating chamber into the airlock owing to the lower pressure in the latter; what fluid does escape by this path is trapped in airlock 214 and drained from this to hot water collection tank 262 for reuse, via drain line 264 and cutout valve 266.

The orifices at the ends of the airlock chamber are fitted with seals which permit the rope to slip therethrough. The outer seal 268 (in end cap 218) restricts the amount of air which escapes from the airlock, while the inner seal 270 (in bulkhead 220) restricts the amount of fluid which leaks into the airlock from the heat set chamber. The seals may preferably be of a straight-shaft type, in the form of a tubular sheath or ring of a suitable material (e.g., polyurethane), with an inside diameter sized slightly smaller than the outer diameter of the rope. In other versions, seals may be provided by inflatable or elastomeric "doughnut" elements having central passages for the rope. In either case, these are preferably configured to permit easy replacement when they become worn due to friction with the rope.

The next compartment in the tube assembly is heat set chamber 222. This chamber serves substantially the same functions as the main tube member 20 of the "batch type" apparatus described above; namely, the fluid in chamber 222 buoys the rope so as to prevent it from being overstressed and damaged, supplies rapid transfer of heat to the fibers of the rope, and permits precise temperature control by coordinated heating and bleeding of pressure from the chamber. It will be noted that the burner rail extends beneath the heat set chamber portion of the tube assembly, but not beneath the cooling chamber 228 so as to avoid unnecessary heating of the latter. Also, while the gas burner heating arrangement has been found preferable for the batch-type embodiment described above (owing to the quick heat-up times it provides), an electric band heater or steam jacket may be preferable as the heat source for the continuous process embodiment illustrated in FIGS. 9–10, since the heat set chamber will be maintained at elevated temperatures over a sustained period of time.

Once the fluid in chamber 222 is heated to the desired temperature, back pressure control valve 242 is selectively opened to relieve the pressure from chamber 222 through manifold 240 and bleed line 244 to cause the fluid in the heat set chamber to boil and stabilize at the desired stretching temperature. It will also be understood that the opening of valve 242 can be adjusted on a continuous basis so as to maintain the correct pressure in chamber 222 as this is subjected to continuous heating by burner rail 210. The systems for monitoring the pressure and temperatures in the heating chamber are essentially the same as those described above, and so are omitted in FIG. 10 in the interest of clarity.

When it becomes necessary to drain off the heating liquid from chamber 222, this is done by opening a second cutout valve 268 so that the liquid passes through drain line 270 into the hot water collection tank 262. Conversely, when it is desired to increase the amount of liquid in this chamber, or to simply refill it, the liquid is drawn from the tank by a pump 272 and pumped through hot water fill line 24 back into chamber 222, with this flow being controlled by valve 274. Also, in some embodiments it may be desirable to provide the collection tank 262 or the associated piping system with a water heater or the like for heating the fluid which is circulated therethrough, so as to augment or possibly replace the burner rail or other heating element at the tube assembly.

The cooling chamber 228 is separated from heat set chamber 222 by insulating divider bulkhead assembly 226; this made up of a layer of insulating material 276 sandwiched between the two metallic flanges 278,280 which are mounted to the cooling and heat set chamber portions of the tube member. A passageway 282 extends through this assembly, and this is sized large enough to permit the rope to pass therethrough without any significant friction; no seal can be used at this point since the rope is in a greatly softened state due to its elevated temperature, and so cannot slip through a sliding seal without sustaining damage. However, the cooling chamber is maintained at the same pressure as heat set chamber 222, the air gaps in these being linked by manifold 240, and so the migration of fluid from one chamber to the next is minimized despite the absence of any seal at passageway 282.

In a manner similar to the heat set chamber, cooling chamber 228 is provided with a drain line 284 and cutout valve 286 which permit the cooling water to be drained into a cold water storage tank 288; this also receives lost cooling water which is drained from the exit airlock 232 via drain line 290 and valve 292. When desired, the cold water is drawn from tank 288 by a pump 294, and is discharged from this through supply line 230 and control valve 296 back into cooling chamber 228. In some embodiments, it may be desirable to provide the storage tank 288 on the associated piping system with a water chiller or the like for maintaining the fluid at the proper temperature.

The rope 250 passes out of the tube assembly via exit airlock chamber 232. As with chamber 214, this is maintained at a pressure slightly below that of the adjacent cooling chamber, by a constant flow of compressed air which is supplied through line 236 and pressure regulator 296. At either end of the chamber there are seals 298 and 300 which minimize the flow of water into the airlock chamber, and also the flow of air out of it.

In addition to preventing the escape of liquid from the heat set and cooling chambers, the airlock chambers may also be employed to augment the process steps carried out in these compartments. For example, controlling the pressure in the entrance airlock facilitates forcing the boiling water into the core of the rope so as to achieve rapid transfer of heat thereto. Similarly, by regulating the air pressure in the exit airlock, cooling of the core of the rope is facilitated.

c. Process Considerations

As was noted above, the motive means for passing the rope through the tube assembly comprises the feed and take-up capstans. The length of time the rope segment 256 between the capstans remains in the heating zone is controlled by the speed of the capstans, as well as by the length of the heat set chamber. The take-up capstan operates at a speed which is greater than that of the feed capstan, so as to apply tension to the rope in the heat set chamber, at which point the rope has the least resistance to stretch. The difference between the speed and/or size of the take-up rolls of the take-up capstan and the speed and/or size of the feed rolls of the feed capstan is proportional to the percent of stretch which is thus achieved; similarly, these factors control the rate at which the rope is stretched.

In an exemplary embodiment, the tube assembly of the apparatus 200 has the following dimensions, and is operated at the following temperature/pressure parameters for heat stretching rope made of fibers:

EXAMPLE

| Chamber Lengths (12-inch i.d. tube member) | |
| --- | --- |
| Tube diameter | 12 inches i.d. |
| Heat set chamber | 8 feet |
| Cooling chamber | 4 feet |
| Insulating bulkhead | 0.5 foot |
| Entrance airlock | 1 foot |
| Exit airlock | 1 foot |
| Temperature/Pressure Parameters | |
| Heat set chamber | 43 psig at 143° C. (boiling) |
| Cooling chamber | 43 psig at 80° C. |
| Entrance airlock | 40 psig |
| Exit airlock | 40 psig |

Given a tube assembly in accordance with the foregoing table, an exemplary rate of throughput for a ¾-inch Spectra TM fiber rope may be approximately 600–800 ft/hr, with a rate of stretch in the range from about 10%/minute to 40%/minute or more. If a higher speed of throughput is desired, this may be achieved by increasing the length of the tube assembly. The foregoing dimensions and parameters are merely illustrative of one exemplary embodiment of the present invention, and these may be varied as desired for specific applications.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. An apparatus for heat stretching a synthetic fiber rope, said apparatus comprising:

a vessel configured to be at least partially filled with a liquid medium, said vessel having a heat set chamber for receiving a segment of said rope so that said segment is suspended in said liquid medium therein;

means for heating said liquid medium in said heat set chamber to at least a predetermined stretching temperature; and means for maintaining said heat set chamber at a pressure at which said liquid medium boils at said stretching temperature, so as to maintain said liquid medium at a uniform temperature level throughout said heat set chamber, and so that said suspended segment of rope is heated uniformly to said predetermined stretching temperature; and means for applying tension to said heated portion of said segment so as to stretch said segment of said rope to a predetermined increase in length of said segment.

2. The apparatus of claim 1, wherein said means for suspending said segment of said rope in said liquid medium further comprises:

means for passing said rope through said heat set chamber of said vessel on a continuous basis, so that said segment in said vessel is removed and replaced from said vessel on a continuous basis as said segment is stretched to said predetermined increase in length.

3. The apparatus of claim 2, wherein said vessel further comprises:

means for cooling said segment of said rope which has been stretched, to a predetermined stabilization temperature, prior to said stretched segment passing out of said vessel.

4. The apparatus of claim 3, wherein said means for cooling said segment which has been stretched comprises:

a cooling chamber in which said liquid medium is maintained approximately at said predetermined stabilization temperature;

said vessel being arranged for sequential passage of said segment of said rope through said heat set chamber and then said cooling chamber.

5. The apparatus of claim 4, wherein said vessel further comprises:

a passageway interconnecting said heat set chamber and said cooling chamber and being sized so as to permit passage of said heated portion of said rope segment therethrough without significant friction; and means for maintaining said heat set chamber and said cooling chamber at approximately equal pressures so as to minimize migration of said liquid medium through said interconnecting passageway.

6. The apparatus of claim 4, wherein said vessel further comprises:

air lock means mounted upstream of said heat set chamber and downstream of said cooling chamber so as to minimize loss of said liquid medium as said rope passes therethrough.

7. The apparatus of claim 4, wherein said means for passing said rope through said vessel on a continuous basis comprises:

a feed capstan attached to said rope upstream of said heat set chamber for feeding said rope into said vessel on a continuous basis; and a take-up capstan attached to said rope downstream of said cooling chamber for withdrawing said rope from said vessel on a continuous basis.

8. The apparatus of claim 7, wherein said means for applying tension to said heated portion of said segment comprises:

means for operating said feed capstan so that said rope is fed into said vessel at a first rate; and means for operating said take-up capstan so that said rope is withdrawn from said vessel at a second rate which exceeds said first rate by an amount which corresponds to said predetermined increase in length of said segment of said rope.

9. The apparatus of claim 1, wherein said means for maintaining said heat set chamber at said pressure comprises:

an exhaust line connected to said heat set chamber; and valve means for selectively bleeding pressure off from said heat set chamber through said exhaust line so as to maintain said heat set chamber at said pressure as said medium in said chamber is heated.

10. The apparatus of claim 1, wherein said means for heating said liquid medium comprises:

a gas burner rail positioned so as to extend beneath said heat set chamber as said medium in said chamber is heated.

11. A method for heat stretching a synthetic fiber rope, said method comprising the steps of:
at least partially filling a vessel with a liquid medium, said vessel having a heat set chamber for receiving a segment of said rope;
suspending a segment of said rope in said liquid medium in said heat set chamber;
heating said liquid medium to at least a predetermined stretching temperature;
maintaining said heat set chamber at a pressure at which said liquid medium boils at said stretching temperature, so as to maintain a uniform temperature level throughout said heat stretch chamber, and so that said suspended segment of rope is uniformly heated to said predetermined stretching temperature; and
applying tension to said heated portion of said segment so as to stretch said segment of said rope to a predetermined increase in length of said segment.

12. The method of claim 11, wherein the step of suspending said segment of said rope in a liquid medium comprises:
suspending said segment in a chamber portion of a vessel which is at least partially filled with said liquid medium.

13. The method of claim 11, wherein the step of suspending said segment of said rope in said liquid medium further comprises:
passing said rope through said heat set chamber of said vessel on a continuous basis, so that said segment in said vessel is removed from said vessel and replaced on a continuous basis as said segment is stretched to said predetermined increase in length.

14. The method of claim 13, further comprising the step of:
cooling said segment of said rope which has been stretched, to a predetermined stabilization temperature, prior to said stretched segment passing out of said vessel.

15. The method of claim 14, wherein the step of passing said rope through said chamber portion of said vessel on a continuous basis comprises:
passing said segment of said rope sequentially through
(a) said heat set chamber in which said liquid medium is maintained approximately at said predetermined stretching temperature; and
(b) a cooling chamber in which said liquid medium is maintained approximately at said predetermined stabilization temperature.

16. The method of claim 15, wherein the step of passing said rope sequentially through said chambers on a continuous basis comprises:
feeding said rope into said vessel on a continuous basis from a feed capstan attached to said rope upstream of said heat set chamber; and
withdrawing said rope from said vessel on a continuous basis with a take-up capstan attached to said rope downstream of said cooling chamber.

17. The method of claim 16, wherein the step of applying tension to said heated portion of said segment comprises;
operating said feed capstan so that said rope is fed into said vessel at a first rate; and
operating said take-up capstan so that said rope is withdrawn from said vessel at a second rate which exceeds said first rate by an amount which corresponds to said predetermined increase in length of said segment of said rope.

* * * * *